United States Patent
Penunuri

(10) Patent No.: US 10,835,867 B2
(45) Date of Patent: Nov. 17, 2020

(54) OCEAN WAVE ACTUATED GRAVITATIONAL DESALINATION SYSTEM

(71) Applicant: Fernando Martin Penunuri, Chula Vista, CA (US)

(72) Inventor: Fernando Martin Penunuri, Chula Vista, CA (US)

( * ) Notice: Subject to any disclaimer, the term of this patent is extended or adjusted under 35 U.S.C. 154(b) by 44 days.

(21) Appl. No.: 16/270,140

(22) Filed: Feb. 7, 2019

(65) Prior Publication Data
US 2020/0254388 A1    Aug. 13, 2020

(51) Int. Cl.
*B01D 61/08* (2006.01)
*B01D 61/04* (2006.01)
*C02F 1/44* (2006.01)
*C02F 103/08* (2006.01)

(52) U.S. Cl.
CPC ............. *B01D 61/08* (2013.01); *B01D 61/04* (2013.01); *C02F 1/44* (2013.01); *B01D 2311/04* (2013.01); *B01D 2311/2649* (2013.01); *B01D 2313/243* (2013.01); *B01D 2313/36* (2013.01); *C02F 2103/08* (2013.01); *C02F 2201/008* (2013.01); *C02F 2201/009* (2013.01); *C02F 2307/00* (2013.01)

(58) Field of Classification Search
CPC .. B01D 61/08; B01D 61/04; B01D 2313/243; B01D 2313/36; B01D 2311/2649; B01D 2311/04; C02F 1/44; C02F 2201/008; C02F 2201/009; C02F 2103/08; C02F 2307/00; F03B 13/20; F03B 13/14; F03B 13/12; Y02A 20/144

USPC ............................................. 210/134; 290/53
See application file for complete search history.

(56) References Cited

U.S. PATENT DOCUMENTS

| | | | | |
|---|---|---|---|---|
| 2,748,482 A | * | 6/1956 | McCully | A61C 5/68 100/110 |
| 4,249,084 A | * | 2/1981 | Villanueva | F03B 13/187 290/53 |
| 4,910,833 A | * | 3/1990 | Barbour | B63B 21/18 24/68 CD |
| 5,017,218 A | * | 5/1991 | Lundstrom | B22F 9/08 75/388 |
| 5,030,342 A | * | 7/1991 | Ortega | E02B 15/106 210/122 |
| 5,615,569 A | * | 4/1997 | Schlatter | B21J 9/025 72/67 |

(Continued)

*Primary Examiner* — Claire A Norris
*Assistant Examiner* — Ekandra S. Miller-Cruz
(74) *Attorney, Agent, or Firm* — Usha Skoshy

(57) ABSTRACT

An ocean wave actuated gravitational desalination apparatus and system for generating potable water comprised of, a box platform with a piston pump at sea level, an inverted prism shaped subterranean water tank below sea level, and a desalination processing structure above sea level. When the ocean waves pass over the top of the box platform, the piston pump is raised to open a set of valves to let the sea water into a cylindrical chamber. When the piston goes down, the valves close and a second set of valves open to release the water into the subterranean tank to be further released into containers on a carousal structure that move on rails by gravity. The water in the containers is emptied into holding and pre-filtration tanks and forced through filters into a pipe by the actions of a hydraulic oil pump and the filtered water released for storage and use.

12 Claims, 7 Drawing Sheets

(56) References Cited

U.S. PATENT DOCUMENTS

| | | | | |
|---|---|---|---|---|
| 7,319,278 B2* | 1/2008 | Gehring | ............... | F03B 13/1885 |
| | | | | 290/42 |
| 7,331,174 B2* | 2/2008 | Welch, Jr. | ................. | E02B 9/08 |
| | | | | 290/53 |
| 2005/0052028 A1* | 3/2005 | Chiang | ................ | F03B 17/005 |
| | | | | 290/1 R |
| 2007/0163943 A1* | 7/2007 | Collins | ................ | B01D 63/021 |
| | | | | 210/335 |
| 2014/0339169 A1* | 11/2014 | Zeren | .................. | B01D 61/025 |
| | | | | 210/652 |
| 2015/0321892 A1* | 11/2015 | Liu | ........................ | B67C 11/066 |
| | | | | 141/335 |
| 2018/0051545 A1* | 2/2018 | Johnson | .................. | E21B 43/26 |

* cited by examiner

OCEAN WAVE ACTUATED GRAVITATIONAL DESALINATION SYSTEM

FIELD OF THE INVENTION

The present invention generally relates to the harnessing of energy from natural sources. More particularly, the invention relates to a system and method for harnessing the energy generated from the motion of ocean waves and the use of that harnessed energy for desalination of salt water from the ocean.

BACKGROUND OF THE INVENTION

The harnessing of energy from natural sources has seen an acceleration in recent years primarily due to the universal desire for non-polluting clean energy to power the various industries and for household consumption. The generation of energy from the sun and wind to power large power plants as well as for residential use have been in vogue for some decades now. Attempts to harness ocean wave energy is a more recent phenomenon. To that end, various systems and devices have been proposed and are currently being used to generate energy from ocean waves for use in place of energy generated by other sources such as coal and nuclear power plants to name a few. The energy produced from ocean wave motion through the principles of hydraulics, pneumatic, electrical and mechanical is converted to electrical energy to power many devices and systems.

Potable water is a scarce commodity in many parts of the world. So, it makes sense to harvest and desalinate part of the approximately 96.5% salt water from the ocean to produce potable water as well as for the generation of water needed in certain industries that depend heavily on water for their functions and maintenance.

Desalination of salt water from the ocean is generally carried out by systems using electrical energy from popular sources. More recently, the use of energy generated through ocean wave motion for the production of potable water is receiving much attention. One of the popular systems used in the conversion of ocean wave energy to assist in the desalination process, is the barge system, in which one or more barges are serially arranged to float on a body of water such as the ocean and connected by pumps designed to draw in the sea water and deliver the water to an onboard desalination system, to generate potable water. Examples of such barge systems can be found in U.S. Pat. Nos. 10,029,927 and 6,863,806. The barge system described in these and other disclosures require two or more barges connected to each other through pumps designed to draw in the sea water and deliver the water to an onboard desalination system. The wave energy conversion system (AWECS) and desalination process of the present invention is better streamlined with only one pump enclosed within a floating box platform moored to the sea bed by means of weights secured to the ends of chain links attached to the bottom four corners of the platform.

The exemplary features of the present invention will become obvious to one skilled in the art through the summary of the invention, detailed description of the invention, and the claims that follow.

SUMMARY OF THE INVENTION

The present invention is an ocean wave actuated gravitational desalination apparatus and system for generating potable water. The exemplary embodiment of the invention is comprised of three main structures: a sea water intake box platform buoyant at sea level with an enclosed piston type pump, an inverted prism shaped subterranean water collection tank secured below sea level, and a desalination processing structure located above sea level.

In the exemplary embodiment of the invention, a substantially square-shaped box platform holding a piston type pump at its center is anchored to the floor of the ocean bed by means of metal weights attached to the distal ends of a set of four metal chains hanging from the four corners of the bottom end of the box platform. In this embodiment of the invention, the length of the metal chains is subject to and adjusted according to the distance from the sea level to the ocean bed so that the top of the box platform is at sea level, to allow the movement of the waves over the surface of the box platform to actuate the pump within the platform, and let the sea water enter the cylindrical chamber of the piston pump.

In this embodiment of the invention, there are floaters attached to the four corners of the top end of the box platform to keep the platform buoyant and afloat at sea level and the metal chains with their weights attached to the lower end of the platform keep the platform anchored to the sea bed. As the ocean waves pass over the top surface of the box platform, a floater attached to the top of the piston pump held within a pressurized cylindrical chamber at the center of the platform, lifts the piston upward, causing a pair of valves located in the middle of the cylindrical chamber holding the piston pump to open, and let the sea water flow into the chamber. Once the sea water enters the chamber, the piston goes down resulting in the middle valves closing and a pair of lower valves within the chamber opening, to release the sea water into a subterranean water tank situated on the ocean floor.

In the exemplary embodiment of the invention, the subterranean water tank has an inverted prism shape resulting in a larger surface area at the top of the tank which automatically creates greater pressure at the tank bottom to push the water out from the tank into a pipe connected to the bottom distal end of the tank, and take the water up the pipe to a variable height above sea level, and get emptied into containers attached to lateral cylindrical rollers circling on the rails of a vertical oval shaped metal carousal structure, positioned above sea level.

In this embodiment of the invention, once the sea water from the prism shaped subterranean tank flows into the top container traveling on the vertical metal carousal structure, that container gets pushed down by gravity and when it reaches the level of a water collection tank which is part of the desalination processing structure, situated to the right of the vertical carousal structure, the water from the container is emptied into the tank through a funnel connected to the tank. The water from the water collection tank then enters a pre-filtration water tank with a hydraulic oil pump. As the emptied container travels down the rails of the carousal structure, the cylindrical rollers of that container encounter a conical press structure having a pendular movement projecting out from within a tank holding hydraulic oil. When the rollers of the container go over the pendular press, the press gets pushed inward into the tank containing the hydraulic oil causing the hydraulic oil from the tank to be ejected into the chamber of a hydraulic oil pump within the pre-filtration water tank holding the sea water. When the hydraulic oil enters the chamber of the hydraulic oil pump, it pushes the metal frame at the front of the pump chamber forward causing the displacement of the water in the pre-filtration water tank into a pipe equipped with filters to filter the salt water and be collected into filtered water holding tanks positioned above sea level.

The present invention thus disclosed in this summary of the invention will become more obvious to one skilled in the art when viewed in conjunction with the drawings and a detailed description of the invention.

DETAILED DESCRIPTION OF THE INVENTION

The present invention is a desalination apparatus and system that uses ocean wave energy along with the principles of gravity to generate potable water from sea water. The system is comprised of a box platform holding a piston pump, a subterranean water tank to collect the sea water and a desalination processing structure to carry out the desalination of salt water.

Figure 1:
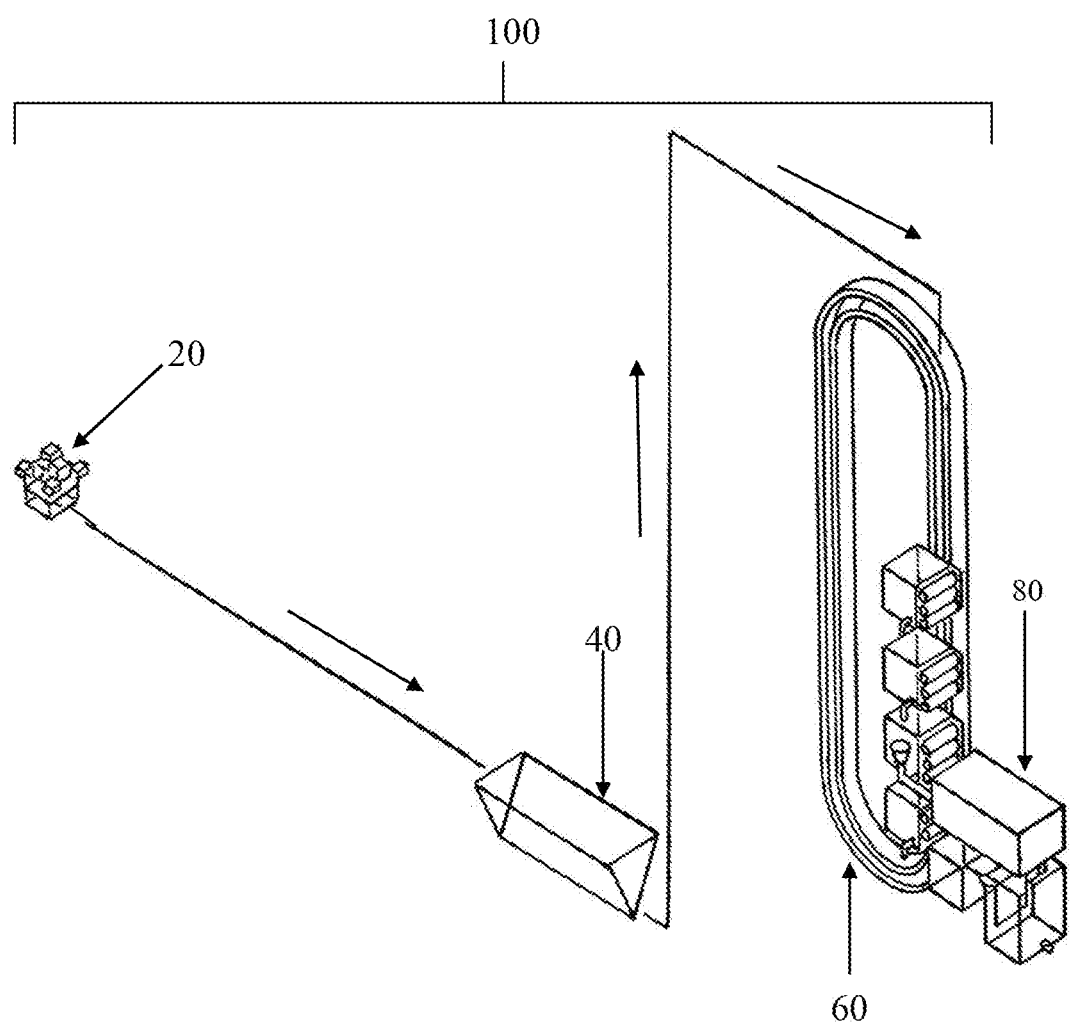
FIG. 1 is an isometric view of the system of the present invention.

Referring now to the drawings wherein like numerals represent like components in the several views presented and discussed, and more particularly referring now to FIG. 1 the figure, is an isometric view of the system 100 of the present invention. A buoyant box platform 20 holding a piston pump is secured to the seabed by means of metal chains and weights. When the ocean waves pass over the top of the box platform 20 the piston pump enclosed within the structure is activated to draw in the sea water and dispense the water into a pipe connected to the top front end of a subterranean water tank 40 situated on the ocean floor. The water tank 40 has the shape of an inverted prism with the top narrow end of the prism resting on the ocean floor, and the broader base of the prism at the top end of the tank. This configuration of the tank, generates a greater water pressure at the bottom narrow inside surface of the tank such that when the water from the pipe connected to the pump within the box platform 20 enters the tank 40 the greater pressure that is generated at the bottom narrow end of the tank, displaces the water out of the water tank 40 into a pipe connected to the bottom distal end of the water tank 40 and the water is forced up that pipe to a variable height to reach the top of a vertical oval shaped metal carousal structure 60 located above sea level and dispensed into a plurality of containers circling on the rails of the carousal structure 60. The containers on the carousal structure move on the rails by force of gravity when the water from the prism shaped tank is dumped into each container as it moves along the track, enabling the constant circular motion of the carousal structure. The water from the containers is released into a pre-filtration water tank connected to a desalination processing structure 80 that uses hydraulic oil to displace the water into a filtration pipe to desalinate the sea water and get it released into a filtered water storage tank on shore.

Figure 2:
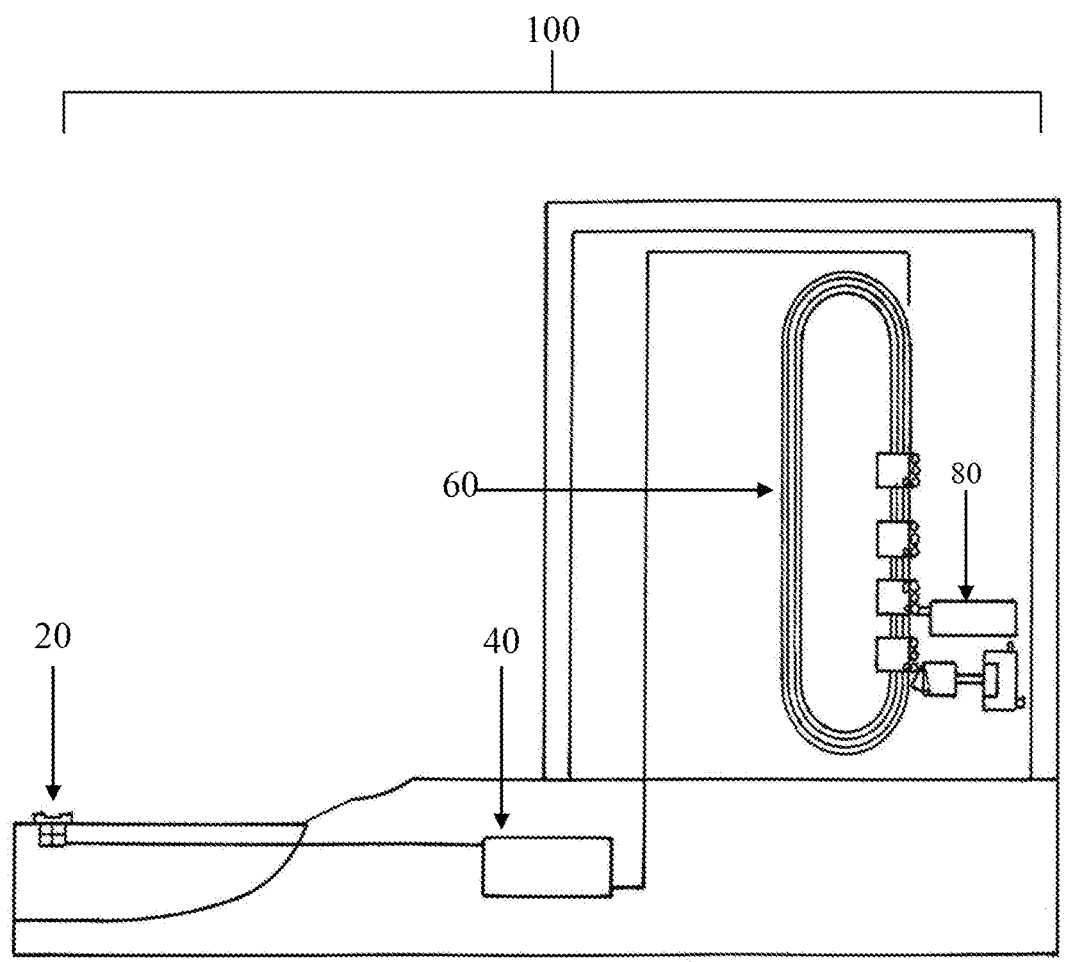
FIG. 2 is a side view of the system of the present invention.

FIG. 2 is a side view of the system 100 of the present invention. The box platform 20 holding the piston pump with its top surface above sea level is connected by a pipe to an inverted prism shaped tank 40 having a larger surface area on the top and a narrower surface area at the bottom end, with the narrow end resting on the sea bed. This configuration of the tank 40 creates greater pressure at the tank bottom to effectively force the water entering the tank from the box platform 20 into a pipe attached to the bottom distal end of the tank 40 and take that water up to a variable height through that pipe, and dispense the water into containers circling around on rails on a carousal like vertical structure 60. The containers move on the rails of the structure 60 by force of gravity as the water gets emptied into each container. The water from each container is emptied into a second tank connected to a desalination processing structure 80 which uses hydraulic oil to push the salt water through a filtration pipe and dispense the desalinated water into fresh water tanks located on shore.

Figure 3:
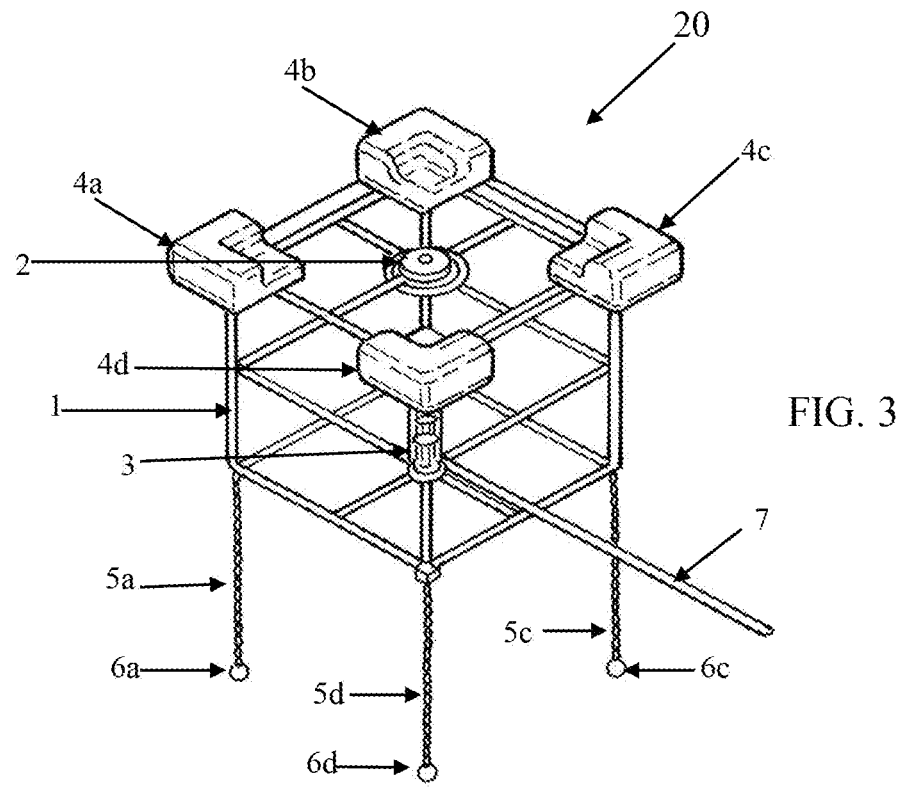
FIG. 3 is a perspective view of the box platform of the present invention.

FIG. 3 is a perspective view of the box platform 20 of the desalination system of the present invention. The box platform 20 is comprised of a square shaped box structure 1 having external floaters 4a, 4b, 4c and 4d attached to the four corners of the top end of the box structure 1 to keep the box platform 20 buoyant and afloat at sea level. The box platform 20 is anchored to the ocean bed by means of a set of four weights 6a to 6d attached to the distal ends of a set of four metal chains 5a to 5d connected to the four corners of the bottom end of the box structure 1. At the center of the box structure 1 is a cylinder chamber 3 holding a piston pump (not seen in this view) with a floater 2 attached at the top end of the piston pump. When the ocean waves pass over the top of the box platform 20 the floater 2 attached to the top end of the piston pump is raised by the movement of the waves passing over the box structure 1 lifting up the piston within the piston pump to let the sea water into the cylinder chamber 3 resulting in the opening of a set of middle valves secured to the side walls of the cylinder chamber 3 to let the sea water inside the chamber 3. Once the sea water enters the cylinder chamber 3 the piston pump goes down activating a second set of valves secured to the side walls of the chamber 3 to open, resulting in the flow of the water into the bottom of chamber 3 and getting released into a pipe connected to the bottom of chamber 3 to be taken to a subterranean tank located on the sea bed in close proximity to the box platform 20.

Figure 4:
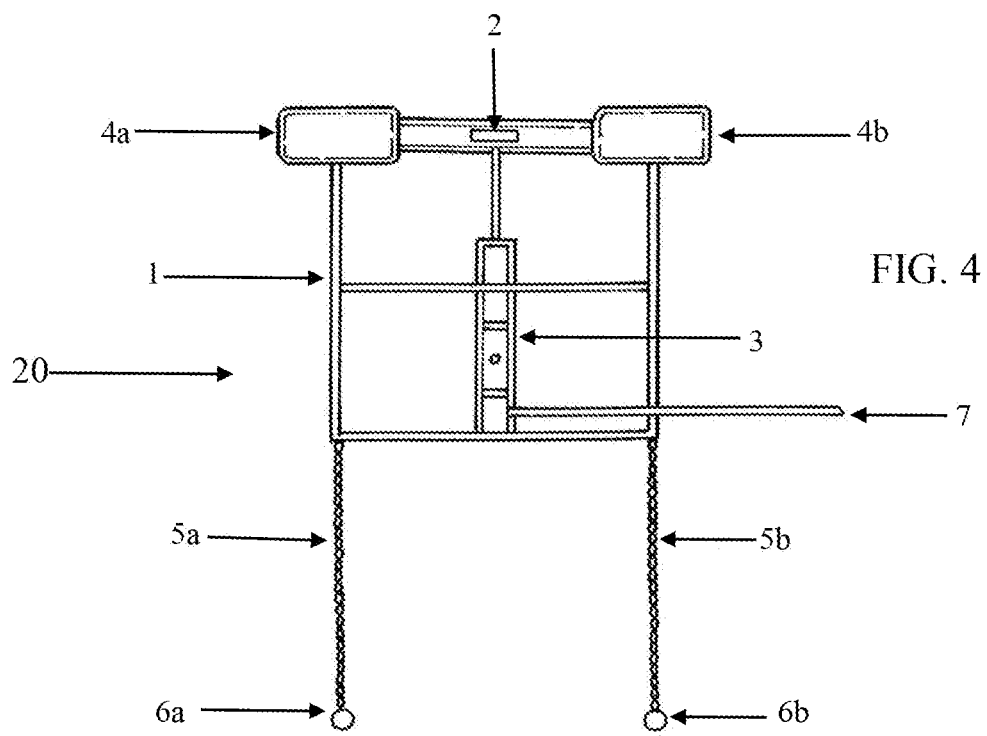
FIG. 4 is a side view of the box platform of the present invention.

FIG. 4 is a side view of the box platform 20 of the present invention with side views of the external floaters 4a and 4b, cylinder chamber 3, metal chains 5a and 5b holding down the box platform 20 to the sea bed by means of weights 6a and 6b.

Figure 5:
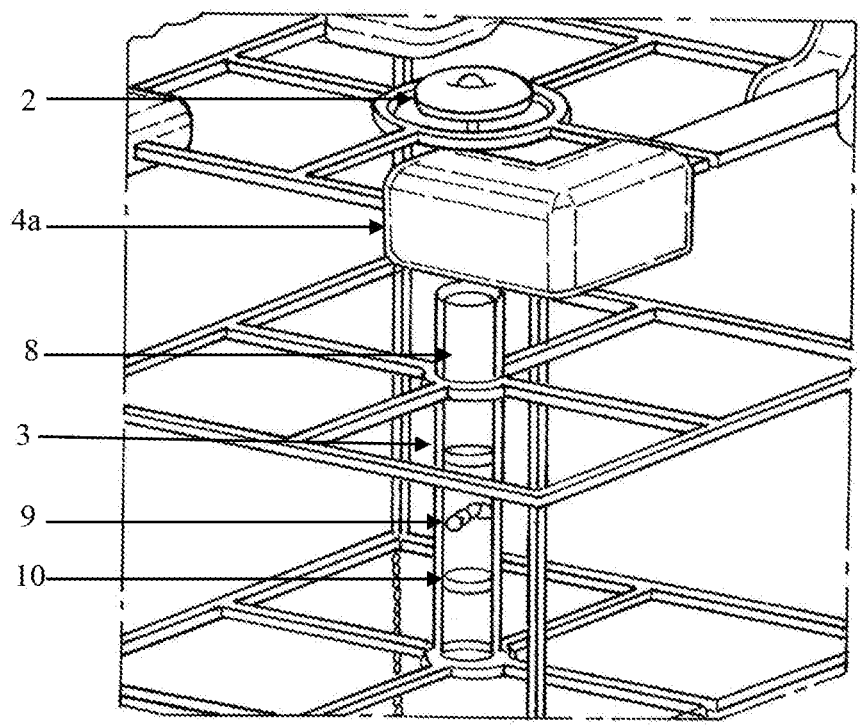
FIG. 5 is a close-up view of the pump system of the present invention.

FIG. 5 is a close-up view of the piston pump system of the present invention. A floater 2 is attached at its bottom end to the top end of the piston pump 8 which is enclosed in a cylinder chamber 3. When the ocean waves pass over the surface of the box platform 20 the floater 2 is activated to pull up the piston pump 8 which in turn opens a set of valves 9 within the cylinder chamber 3 to let the ocean water into the chamber 3. Once the water enters the cylinder chamber 3 the piston pump 8 goes down activating a lower set of valves 10 to open and release the water in the chamber 3 into a subterranean water tank located on the sea bed.

Figure 6:
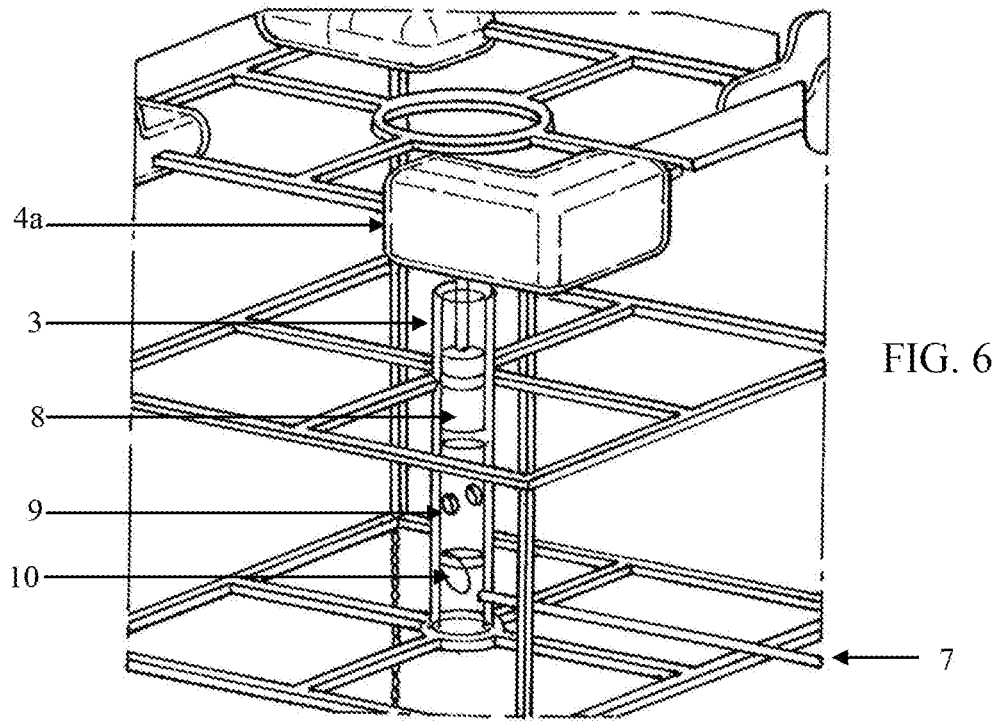
FIG. 6 is a second close-up view of the pump system of the present invention.

FIG. 6 is a second close-up view of the piston pump system of the present invention. In this view, the piston pump 8 is seen in the down position after the water has entered the chamber 3 with the first set of valves 9 appearing to close and the second set of valves 10 opening to release the water into the pipe 7 which will transport the water to the subterranean water tank on the sea bed.

Figure 7:
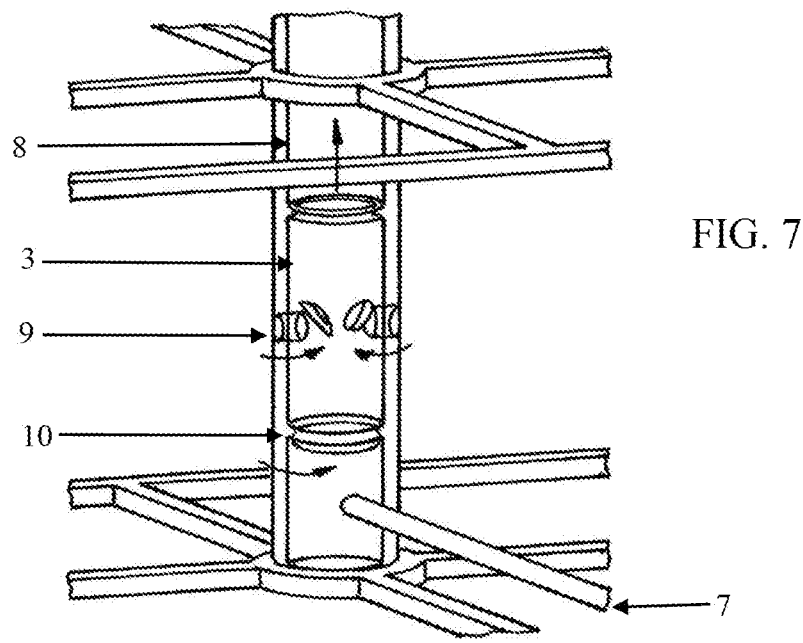
FIG. 7 is a close-up view of the operations of the valves within the pump system of the invention.

FIG. 7 is a close-up view of the operation of the valves within the pump system of the invention. This view illustrates the workings of the first set of valves 9 within the cylinder chamber 3 as the piston pump 8 goes up to let the ocean water into the chamber 3. In this view, the second set off valves 10 is seen in the closed position.

Figure 8:
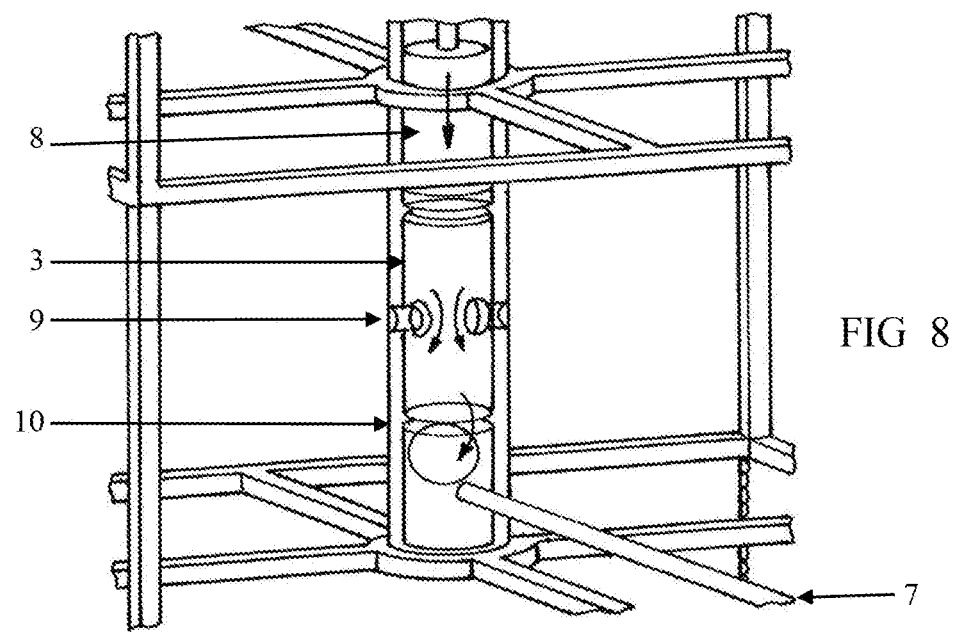
FIG. 8 is a second close-up view of the operation of the valves within the pump system of the invention.

FIG. 8 is a second close-up view of the operation of the valves within the pump system of the invention. This view illustrates the workings of the two sets of valves within the piston pump chamber 3. In this view, the piston pump 8 is seen in the downward position with the first set of valves 9 having opened to let the sea water in and about to close while the second set of valves 10 are opening to release the water into the pipe 7 to be transported to the subterranean water tank.

Figure 9:
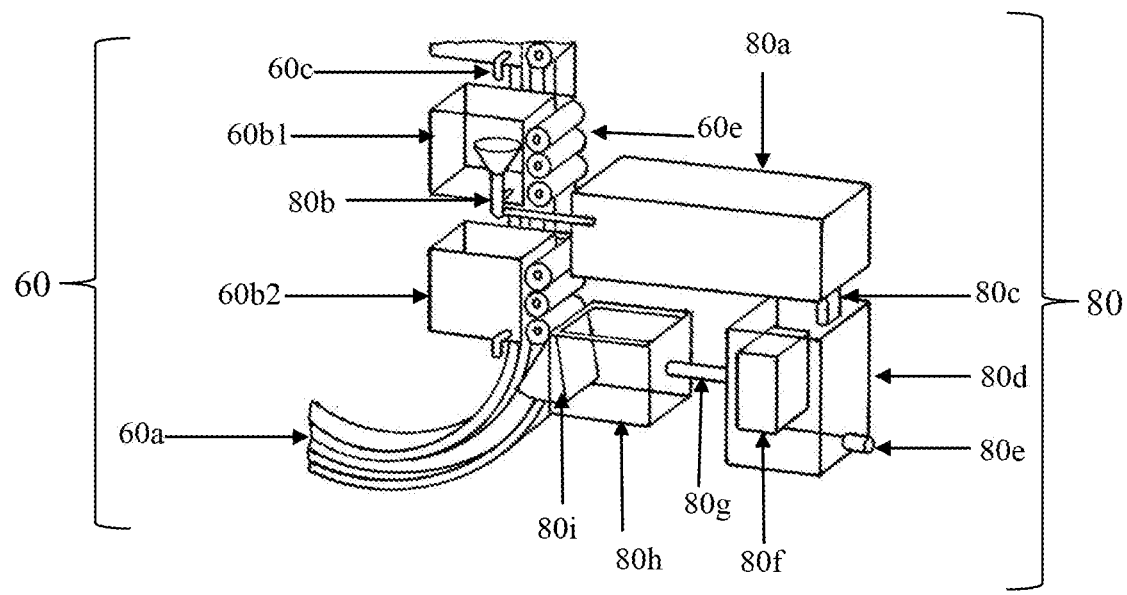
FIG. 9 is a perspective view illustrating the interaction between the water containers on the carousal structure and the desalination processing structure of the present invention.

FIG. 9 is a perspective view illustrating the interaction between the water containers on the carousal structure 60 and the desalination processing structure 80 of the present invention. The figure shows a dissected view of the vertical carousal structure 60 illustrating the encounters between two water containers 60*b*1 and 60*b*2 with the parts of the desalination processing structure 80. These water containers 60*b*1 and 60*b*2 have a set of rollers 60*e* attached to one side which allows these containers to move down along the side of the oval carousal structure 60 rail tracks 60*a* by means of gravity. The view shows that when the sea water from the subterranean water tank is dispensed into the container 60*b*1 from a faucet 60*c* located at the bottom end of the previous container holding the sea water, the container 60*b*1 moves down over the rails 60*a* by force of gravity due to the weight of the water in the container with the help of the rollers 60*e*. As the containers are pushed down by gravity, they automatically move in a circular motion on the carousal structure 60. As the container 60*b*1 moves down the rails, the water from container 60*b*1 is dispensed into a funnel 80*b* connected to a water collection tank 80*a* which is part of the desalination processing structure 80. The water collected in the water collection tank 80*a* is taken down a tube 80*c* into a pre-filtration water tank 80*d* which holds a hydraulic oil pump 80*f*. As the container 60*b*1 moves down the rail track 60*a* by force of gravity, the container 60*b*2 below the container 60*b*1 gets pushed down the rail 60*a* with the help of its own rollers 60*e*. The hydraulic oil tank 80*h* of the desalination processing structure 80 is configured with a conical shaped press structure 80*i* having a pendular movement that protrudes out from the side of the hydraulic oil tank 80*h*. As the container 60*b*2 is pushed down the rails, the rollers 60*e* of the container press against the conical press 80*i* pushing the press 80*i* inward into the hydraulic oil tank 80*h* containing hydraulic oil which makes the hydraulic oil from the tank 80*h* get ejected through a tube 80*g* into a hydraulic oil pump chamber 80*f* located within the pre-filtration water tank 80*d* holding the sea water. When the hydraulic oil from the tank 80*h* enters the hydraulic oil pump chamber 80*f*, the oil pushes a metal frame at the front end of the hydraulic oil pump chamber 80*f* forward causing the displacement of the water in the pre-filtration water tank 80*d* into a pipe 80*e* equipped with filters to filter the salt water and be collected into filtered water holding tanks positioned on shore, above sea level.

Figure 10:
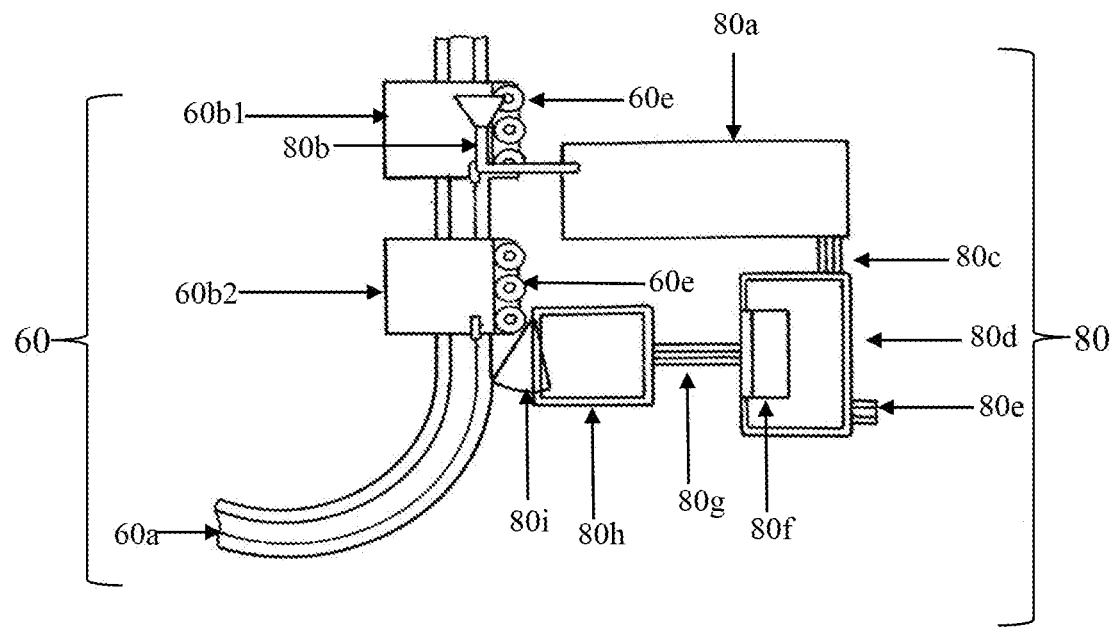
FIG. 10 is a side view illustrating the interaction between the water containers on the carousal structure and the desalination processing structure of the present invention.

FIG. 10 shows a side view illustrating the interaction between the water containers on the carousal structure 60 and the desalination processing structure 80 of the present invention, more specifically showing the encounter of the container 60*b*2 rollers 60*e* with the conical press 80*i* projecting out of the hydraulic oil tank 80*h*. When the rollers 60*e* on container 60*b*2 push the press 80*i* into the hydraulic oil tank 80*h* the hydraulic oil from that tank is released by pressure into a pipe 80*g* and into the hydraulic oil pump chamber 80*f* which acts in the manner mentioned previously to displace the sea water in the pre-filtration water tank 80*d* into the filtration pipe 80*e* to be carried into a filtered water storage tank on shore. Once the water in the pre-filtration tank 80*d* is displaced into the filtration pipe 80*e* the hydraulic oil in the hydraulic oil pump 80*f* moves back into the hydraulic oil chamber 80*h* to start the entire process again.

Figure 11:
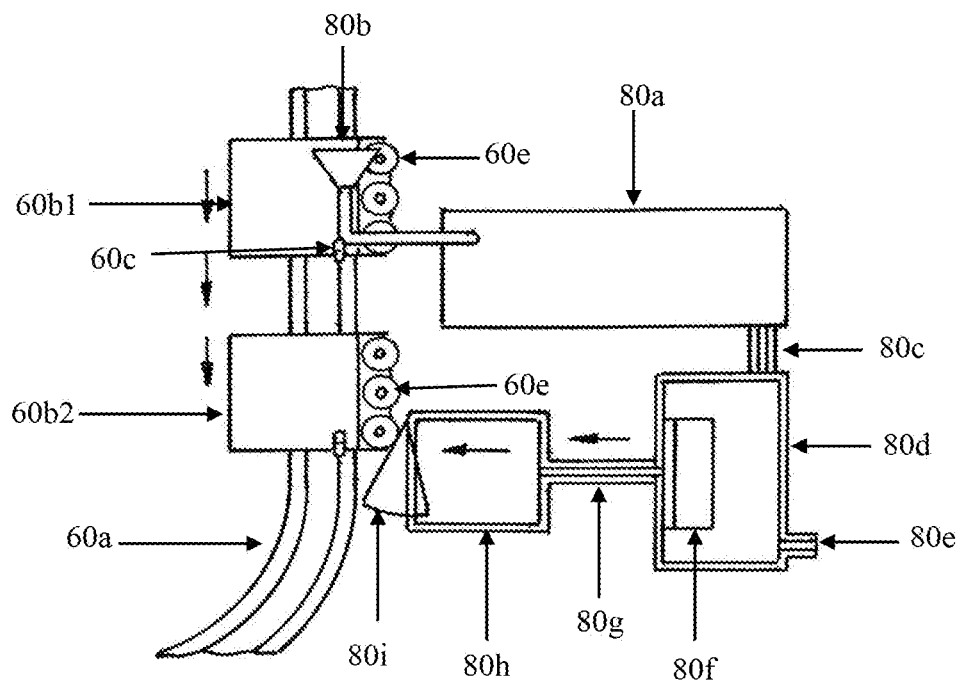
FIG. 11 is a perspective view illustrating the operations of the carousal structure and the desalination processing structure of the present invention.
Figure 12:
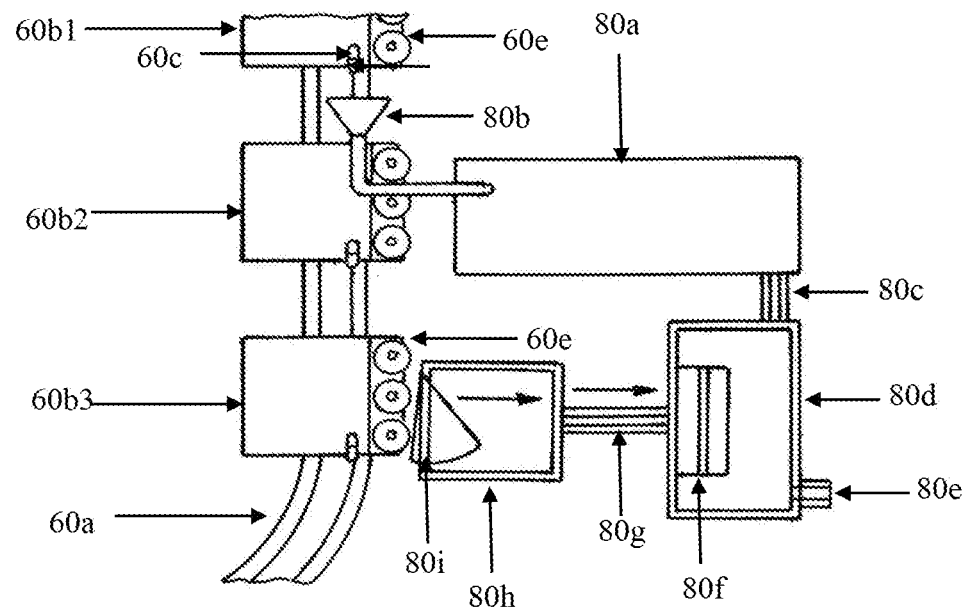
FIG. 12 is a second perspective view illustrating the operations of the carousal structure and the desalination processing structure of the present invention.

FIG. 11 and FIG. 12 illustrate more specifically the interactive operations of the several parts of the carousal structure 60 and the desalination processing structure 80 of the invention. FIG. 11 illustrates the positions of the press 80*i* and hydraulic oil pump 80*f* before the rollers 60*e* of container 60*b*2 push the press 80*i* into the hydraulic oil tank 80*h* forcing the hydraulic oil in the tank to be released into the hydraulic oil pump 80*f* through the tube 80*g*. Once the sea water in the pre-filtration water tank 80*d* has been displaced into the filtration pipe 80*e* the hydraulic oil inside the hydraulic pump 80*f* returns to the hydraulic oil chamber 80*h*.

In FIG. 12 the rollers 60*e* of container 60*b*3 have pushed the press 80*i* into the hydraulic oil chamber 80*h* resulting in the hydraulic oil in the hydraulic oil tank 80*h* to be pressured into the pipe 80*g* to be dispensed into the hydraulic oil pump 80*f*. When the hydraulic oil enters the chamber of the hydraulic oil pump 80*f* it pushes a metal frame at the front of the pump forward causing the displacement of the water in the pre-filtration tank 80*d* into the filtration pipe 80*e* equipped with filters to filter the salt water and be collected into filtered water holding tanks located above sea level While the present invention has thus been described through its preferred embodiments and related figures, it is to be understood that the embodiments of the present invention as described herein do not limit any application or scope of the invention and that the invention can be carried out and practiced in various ways and implemented in embodiments other than the ones outlined and described above. It should be understood and obvious to one skilled in the art that alternatives, modifications, and variations of the embodiments of the present invention may be construed as being within the spirit and scope of the appended claims.

What is claimed is:

1. An ocean wave actuated gravitational desalination apparatus and system comprising:
   a buoyant substantially square-shaped box platform structure;
   said square-shaped box platform structure having a top end at a sea level and a bottom end anchored to a sea bed by means of a plurality of four weights attached to a distal end of a set of four metal chains, said set of four metal chains hingedly connected to four corners of said bottom end of said square-shaped box platform structure;

a prism-shaped subterranean water tank structure positioned on the sea bed;

a substantially vertical oval-shaped carousal structure comprising a plurality of water container structures capable of traveling on rails configured on said vertical oval-shaped carousal structure, said vertical oval-shaped carousal structure positioned above sea level;

a desalination processing structure, said desalination processing structure positioned above sea level;

said top end of said square-shaped box platform structure having a set of floaters at four corners of said top end of said square-shaped box platform structure to keep said square-shaped box platform structure buoyant and afloat at sea level;

a piston pump structure held perpendicularly within a substantially cylindrical chamber structure at an axial center of said square-shaped box platform structure;

a top end of said piston pump structure held up to sea level by means of a floater structure attached to a top end of said piston pump structure;

said cylindrical chamber structure having a plurality of valves secured to an interior side wall of said cylindrical chamber structure;

said square-shaped box platform structure, said prism-shaped subterranean water tank structure and said vertical oval-shaped carousal structure are connected to each other by means of pipes; and said desalination processing structure is comprised of a sea water collection tank, a pre-filtration water tank, a hydraulic oil tank, a hydraulic oil pump chamber within said pre-filtration water tank and a filtration pipe connected to a bottom end of said pre-filtration water tank.

2. The ocean wave actuated gravitational desalination apparatus and system of claim 1 wherein the length of the metal chains is subject to and adjusted according to the distance from the sea level to the sea bed so that the top end of the square-shaped box platform structure is at sea level, to allow the movement of the ocean waves to actuate the piston pump structure held within the square-shaped box platform structure, and let the sea water enter the cylindrical chamber structure of the piston pump structure.

3. The ocean wave actuated gravitational desalination apparatus and system of claim 1 wherein the prism-shaped subterranean water tank structure has an inverted prism shape with a narrow prism-shaped end of the prism-shaped subterranean water tank structure resting on the sea bed and a broader base of the prism-shaped subterranean water tank structure positioned at the top end of the prism-shaped subterranean water tank structure creating greater water pressure at the narrow prism-shaped end of the prism-shaped subterranean water tank structure to effectively force the sea water in the prism-shaped subterranean water tank into a pipe attached to the bottom distal end of the prism-shaped subterranean water tank and take the sea water up to a variable height above sea level and dispense the sea water into the plurality of water container structures circling around on the rails of the vertical oval-shaped carousal structure positioned above sea level.

4. The ocean wave actuated desalination apparatus and system of claim 1 wherein the plurality of valves secured to the interior side wall of the cylindrical chamber structure of the piston pump structure are comprised of a first set of valves which open to let sea water into the cylindrical chamber structure and a second set of valves that open to release the sea water into the pipe connecting the square-shaped box platform structure to the prism-shaped subterranean water tank structure.

5. The ocean wave actuated gravitational desalination apparatus and system of claim 4 wherein when the ocean waves pass over the top end of the square-shaped box platform structure, the floater structure attached to the top end of the piston pump structure is raised along with the piston pump structure by the movement of the ocean waves passing over the square-shaped box platform structure and when the piston pump structure is raised, the first set of valves within the cylindrical chamber structure open to let the sea water into the cylindrical chamber structure and once the sea water enters the cylindrical chamber structure, the first set of valves close and the second set of valves within the cylindrical chamber structure open to release the sea water into the pipe connecting the square-shaped box platform structure and the prism-shaped subterranean water tank structure.

6. The ocean wave actuated gravitational desalination apparatus and system of claim 1 wherein the sea water from the plurality of water container structures traveling on the rails of the vertical oval-shaped carousal structure is dispensed into the sea water collection tank of the desalination processing structure through a faucet at the bottom end of each water container structure and into a funnel that is attached to the sea water collection tank of the desalination processing structure.

7. The ocean wave actuated gravitational desalination apparatus and system of claim 6 wherein the sea water released into the sea water collection tank from the plurality of water container structures is further released from the sea water collection tank into the pre-filtration water tank of the desalination processing structure.

8. The ocean wave actuated gravitational desalination apparatus and system of claim 1 wherein the plurality of water container structures on the vertical oval-shaped carousal structure are equipped with lateral cylindrical rollers attached to one side of each water container structure to assist in the movement of the water container structure over the rails of the vertical oval-shaped carousal structure.

9. The ocean wave actuated gravitational desalination apparatus and system of claim 1 wherein the hydraulic oil tank of the desalination processing structure is configured with a conical shaped press having a pendular movement that protrudes out from a side of the hydraulic oil tank.

10. An ocean wave actuated gravitational desalination apparatus and system comprising:

a square-shaped box platform;

a plurality of floaters positioned at four corners of a top end of said square-shaped box platform to keep said square-shaped box platform buoyant and afloat at sea level;

metal chains hingedly attached to a bottom end of said four corners of said square-shaped box platform;

a plurality of weights attached to distal ends of said metal chains hingedly attached to a bottom end of said four corners of said square-shaped box platform to anchor said square-shaped box platform to an ocean bed;

a piston pump held perpendicularly within a cylindrical chamber at an axial center of said square-shaped box platform;

a top end of said piston pump held up to sea level by means of a floater structure attached to said top end of said piston pump;

said cylindrical chamber having a plurality of valves secured to an interior side wall of said cylindrical chamber to let sea water into said cylindrical chamber and release said sea water from said cylindrical chamber;

a prism-shaped subterranean water tank with a narrow end of said prism-shaped subterranean water tank resting on an ocean floor to receive sea water released from said cylindrical chamber at said axial center of said square-shaped box platform;

a vertical carousal structure positioned above sea level;

said vertical carousal structure comprising rails and a plurality of water containers having a plurality of lateral cylindrical rollers attached to a side of said water containers to move said water containers along said rails of said vertical carousal structure;

said narrow end of said prism-shaped subterranean water tank resting on said ocean floor generating a greater water pressure at said narrow end of said prism-shaped subterranean water tank to displace said sea water entering said prism-shaped subterranean water tank from said square-shaped box platform to displace said sea water out of said prism-shaped subterranean water tank to a variable height into said plurality of water containers on said vertical carousal structure;

wherein said plurality of water containers holding sea water from said prism-shaped subterranean water tank travel on said rails of said vertical carousal structure by force of gravity due to a weight of said sea water dispensed into a first of said plurality of water containers which pushes down remaining said plurality of water containers on said vertical carousal structure;

a desalination processing apparatus comprised of a sea water collection tank, a pre-filtration water tank, a hydraulic oil tank holding hydraulic oil, a hydraulic oil pump chamber within said pre-filtration water tank and a filtration pipe connected to a bottom end of said pre-filtration water tank;

said hydraulic oil tank of said desalination processing apparatus configured with a conical shaped press having a pendular movement that protrudes out from a side of said hydraulic oil tank;

said plurality of water containers move down said rails of said vertical carousal structure by said force of gravity when said sea water from said plurality of water containers is emptied into said sea water collection tank; and said plurality of lateral cylindrical rollers attached to a side of said water containers press against said conical-shaped press having a pendular movement that protrudes out from a side of said hydraulic oil tank to push said conical-shaped press into said hydraulic oil tank holding said hydraulic oil and ejects said hydraulic oil through a tube into said hydraulic oil pump chamber within said pre-filtration water tank holding said sea water.

11. The ocean wave actuated desalination apparatus and system of claim 10 wherein when the hydraulic oil is released into the hydraulic oil pump chamber, the hydraulic oil pushes a metal frame at the front of the hydraulic oil pump chamber forward causing the displacement of the sea water in the pre-filtration water tank into the filtration pipe equipped with filters to filter the sea water and be collected into filtered water holding tanks located above sea level.

12. The ocean wave actuated desalination apparatus and system of claim 11 wherein once the sea water in the pre-filtration water tank is displaced into the filtration pipe attached at the bottom end of the pre-filtration tank, the hydraulic oil in the hydraulic oil pump chamber moves back into the hydraulic oil pump chamber.

\* \* \* \* \*